(12) United States Patent
Mao et al.

(10) Patent No.: US 10,972,651 B2
(45) Date of Patent: Apr. 6, 2021

(54) METHOD AND SYSTEM FOR IRIS RECOGNITION

(71) Applicant: ZKTECO USA, LLC, Fairfield, NJ (US)

(72) Inventors: Juyong Mao, Beijing (CN); Peisheng Li, Foshan (CN); Zhinong Li, Beijing (CN)

(73) Assignee: ZKTECO USA LLC, Fairfield, NJ (US)

( * ) Notice: Subject to any disclaimer, the term of this patent is extended or adjusted under 35 U.S.C. 154(b) by 0 days.

(21) Appl. No.: 16/177,873

(22) Filed: Nov. 1, 2018

(65) Prior Publication Data

US 2019/0273873 A1 Sep. 5, 2019

(30) Foreign Application Priority Data

Mar. 2, 2018 (CN) .......................... 201810176098.4

(51) Int. Cl.
*H04N 5/232* (2006.01)
*G06K 9/00* (2006.01)
*H04N 5/247* (2006.01)

(52) U.S. Cl.
CPC ... *H04N 5/232125* (2018.08); *G06K 9/00604* (2013.01); *H04N 5/247* (2013.01)

(58) Field of Classification Search
CPC ............. H04N 5/2258; H04N 5/23238; H04N 5/23296; H04N 5/2226; H04N 5/247; H04N 13/25; H04N 5/2251; H04N 5/232; H04N 5/232125; H04N 5/3415; H04N 13/239; H04N 13/243; H01L 41/042;
(Continued)

(56) References Cited

U.S. PATENT DOCUMENTS 10,142,560 B2 * 11/2018 Venkataraman ... H04N 5/23238
10,389,948 B2 *  8/2019 Nash .................. H04N 5/23293
(Continued)

*Primary Examiner* — Nathnael Aynalem
(74) *Attorney, Agent, or Firm* — Pillsbury Winthrop Shaw Pittman LLP

(57) ABSTRACT

The present application discloses an iris identification system and an iris identification method thereof. The iris identification system includes: a camera module including at least two cameras, the cameras having different depths of field and being configured to capture iris images; a distance detection apparatus configured to detect a distance between a user and the camera module; a processing chip configured to find, according to the detected distance, a depth of field corresponding the distance and control a camera having the depth of field to be turned on, and further configured to control multiple cameras in the camera module to be turned on simultaneously until one camera has captured an ideal image. At least two cameras having different depths of field are disposed in the iris identification system provided in the present application; a camera having a suitable depth of field is turned on correspondingly according to a detected distance between a user and a camera module to capture an image, or multiple cameras are turned on simultaneously until one camera has captured a clear iris image. The present application achieves good man-machine friendliness and a short capturing time and improves the efficiency of iris identification.

13 Claims, 3 Drawing Sheets

(58) Field of Classification Search
CPC .............. H01L 41/047; H01L 41/0926; G06K 9/00597; G06K 9/00604; G06K 9/0061; G06K 9/00617
USPC ...................................... 348/218.1
See application file for complete search history.

(56) References Cited

U.S. PATENT DOCUMENTS

| | | | |
|---|---|---|---|
| 2002/0130961 A1* | 9/2002 | Lee ................... | G06K 9/00597 348/333.03 |
| 2006/0187338 A1* | 8/2006 | May ..................... | H04N 5/2254 348/375 |
| 2012/0262607 A1* | 10/2012 | Shimura .............. | H04N 5/2258 348/239 |
| 2012/0307092 A1* | 12/2012 | Kotani ................ | H04N 5/2226 348/218.1 |
| 2015/0312445 A1* | 10/2015 | Cha ..................... | H04N 5/2226 348/48 |
| 2016/0377426 A1* | 12/2016 | Kim ........................ | G01C 3/08 348/135 |
| 2017/0034423 A1* | 2/2017 | Inoue .................. | H04N 13/243 |

* cited by examiner

METHOD AND SYSTEM FOR IRIS RECOGNITION

CROSS REFERENCE TO RELATED APPLICATION

The present application claims priority to Chinese Patent Application No. 201810176098.4 filed with the Chinese Patent Office on Mar. 2, 2018, which is incorporated herein by reference in its entirety.

TECHNICAL FIELD

The present invention relates to the field of biometric identification characteristics, and in particular, to an iris identification system and an iris identification method of same.

BACKGROUND ART

Existing iris image capturing apparatuses are mainly classified into two types, one type is contact iris capturing apparatuses and the other type is non-contact iris capturing apparatuses.

When a user uses a contact iris capturing apparatus, glasses need to be fixed on a certain component of the capturing apparatus. In such a capturing manner, eyeballs of the user can be desirably placed at suitable positions, so that a clear iris image with ideal illumination can be captured. However, this contact capturing manner will significantly reduce user acceptance.

The non-contact iris capturing apparatuses are further classified into fixed-focus capturing apparatuses and zoom capturing apparatuses. The fixed-focus capturing apparatus needs a prompt system to prompt a user to move the head back and forth, and when the eyes of the user are located at suitable positions, the capturing apparatus captures a clear iris image. The zoom capturing apparatus does not require a user to move the head back and forth, and the capturing apparatus changes a focal length automatically, so that a camera focuses on the iris of the user to capture a clear iris image.

The fixed-focus capturing apparatus has a simple structure and low costs but has a high requirement on users and poor man-machine friendliness. The zoom capturing apparatus generally has a zoom motor and a focusing motor. It is judged through a dedicated algorithm such as image definition estimation whether accurate focusing has been achieved. Then, the zoom motor and the focusing motor are controlled to rotate by using a dedicated control system. Accurate focusing is achieved after the foregoing steps are repeated multiple times. Therefore, the zoom capturing apparatus has a complex structure and high costs, while its advantage lies in good man-machine friendliness.

In addition, for the fixed-focus capturing apparatus, a user sometimes needs to move the head back and forth repeatedly to reach an alignment position. For the zoom capturing apparatus, the focal length sometimes needs to be adjusted repeatedly so that the camera focuses on the eyes of the user. Therefore, both the capturing methods have the problem of an excessively long capturing time.

SUMMARY OF THE INVENTION

Accordingly, an objective of the present invention is to provide an iris identification system and an iris identification method of same, so that an overall range for iris acquisition can be expanded, and the man-machine friendliness as well as the efficiency of iris identification can be improved. Specific solutions are as follows:

An iris identification system includes: a camera module, a distance detection apparatus connected to the camera module, and a processing chip connected to the camera module and the distance detection apparatus respectively, wherein the camera module includes at least two cameras, the cameras having different depths of field and being configured to capture iris images;

the distance detection apparatus is configured to detect a distance between a user and the camera module and send the distance to the processing chip; and the processing chip is configured to find, according to the detected distance, a depth of field corresponding the distance and control a camera having the depth of field to be turned on, and further configured to control multiple cameras in the camera module to be turned on simultaneously, until one camera has captured an ideal image.

Preferably, in the iris identification system provided by the embodiment of the present invention, the camera module specifically includes a first camera having a first depth of field, a second camera having a second depth of field, a third camera having a third depth of field, and a fourth camera having a fourth depth of field; and the processing chip is specifically configured to control the first camera to be turned on when it is detected that the distance is in a range of the first depth of field; control the second camera to be turned on when it is detected that the distance is in a range of the second depth of field; control the third camera to be turned on when it is detected that the distance is in a range of the third depth of field; and control the fourth camera to be turned on when it is detected that the distance is in a range of the fourth depth of field.

Preferably, in the iris identification system provided by the embodiment of the present invention, the range of the first depth of field is 40 cm to 44 cm;

the range of the second depth of field is greater than 44 cm and less than or equal to 48 cm;

the range of the third depth of field is greater than 48 cm and less than or equal to 52 cm; and the range of the fourth depth of field is greater than 52 cm and less than or equal to 56 cm.

Preferably, in the iris identification system provided by the embodiment of the present invention, the first camera, the second camera, the third camera and the fourth camera are arranged in a diagonal manner.

Preferably, in the iris identification system provided by the embodiment of the present invention, the camera module further comprises an auxiliary light source; and the auxiliary light source is an infrared light source.

An embodiment of the present invention further provides an iris identification method of the foregoing iris identification system provided by the embodiment of the present invention, the iris identification system includes a camera module, a distance detection apparatus connected to the camera module, and a processing chip connected to the distance detection apparatus; the camera module includes at least two cameras, the cameras having different depths of field; and the iris identification method includes:

detecting, by the distance detection apparatus, a distance between a user and the camera module and sending the distance to the processing chip;

finding, by the processing chip according to the detected distance, a depth of field corresponding the distance and controlling a camera having the depth of field to be turned on; or controlling, by the processing chip, multiple cameras in the camera module to be turned on simultaneously, until one camera has captured an ideal image.

Preferably, in the iris identification method of the iris identification system provided by the embodiment of the present invention, when the camera module specifically includes a first camera having a first depth of field, a second camera having a second depth of field, a third camera having a third depth of field, and a fourth camera having a fourth depth of field, the step of finding, by the processing chip according to the detected distance, a depth of field corresponding the distance and controlling a camera having the depth of field to be turned on specifically includes:

controlling, by the processing chip, the first camera to be turned on when it is detected that the distance is in a range of the first depth of field; controlling, by the processing chip, the second camera to be turned on when it is detected that the distance is in a range of the second depth of field; controlling, by the processing chip, the third camera to be turned on when it is detected that the distance is in a range of the third depth of field; and controlling, by the processing chip, the fourth camera to be turned on when it is detected that the distance is in a range of the fourth depth of field.

Preferably, in the iris identification method of the iris identification system provided by the embodiment of the present invention, the range of the first depth of field is 40 cm to 44 cm;

the range of the second depth of field is greater than 44 cm and less than or equal to 48 cm;

the range of the third depth of field is greater than 48 cm and less than or equal to 52 cm; and the range of the fourth depth of field is greater than 52 cm and less than or equal to 56 cm.

Preferably, in the iris identification method of the iris identification system provided by the embodiment of the present invention, the first camera, the second camera, the third camera and the fourth camera are arranged in a diagonal manner.

Preferably, in the iris identification method of the iris identification system provided by the embodiment of the present invention, the camera module further includes an auxiliary light source; and the auxiliary light source is an infrared light source.

The present invention provides an iris identification system and an iris identification method of same. The iris identification system includes: a camera module, a distance detection apparatus connected to the camera module, and a processing chip connected to the camera module and the distance detection apparatus respectively, wherein the camera module includes at least two cameras, the cameras having different depths of field and being configured to capture iris images; the distance detection apparatus is configured to detect a distance between a user and the camera module and send the distance to the processing chip; and the processing chip is configured to find, according to the detected distance, a depth of field corresponding the distance and control a camera having the depth of field to be turned on, and further configured to control multiple cameras in the camera module to be turned on simultaneously until one camera has captured an ideal image. At least two cameras having different depths of field are disposed in the iris identification system provided in the present application; a camera having a suitable depth of field is turned on correspondingly according to a detected distance between a user and a camera module to capture an image, or multiple cameras are turned on simultaneously until one camera has captured a clear iris image. As such, an overall range for iris acquisition can be expanded. Moreover, the present application achieves good man-machine friendliness and a short capturing time and improves the efficiency of iris identification.

BRIEF DESCRIPTION OF THE DRAWINGS

In order to illustrate the technical solutions according to the embodiments of the present invention or in the prior art more clearly, the accompanying drawings required for describing the embodiments or the prior art are introduced briefly in the following. It is apparent that the accompanying drawings in the following description are only some embodiments of the present invention. Those of ordinary skill in the art can obtain other drawings according to the accompanying drawings without creative efforts.

DETAILED DESCRIPTION

The technical solutions in the embodiments of the present invention are described clearly and completely in the following with reference to the accompanying drawings in the embodiments of the present invention. Apparently, the described embodiments are merely some, rather than all, of the embodiments of the present invention. Based on the embodiments of the present invention, all other embodiments obtained by those of ordinary skill in the art without creative efforts should belong to the protection scope of the present invention.

Figure 1:
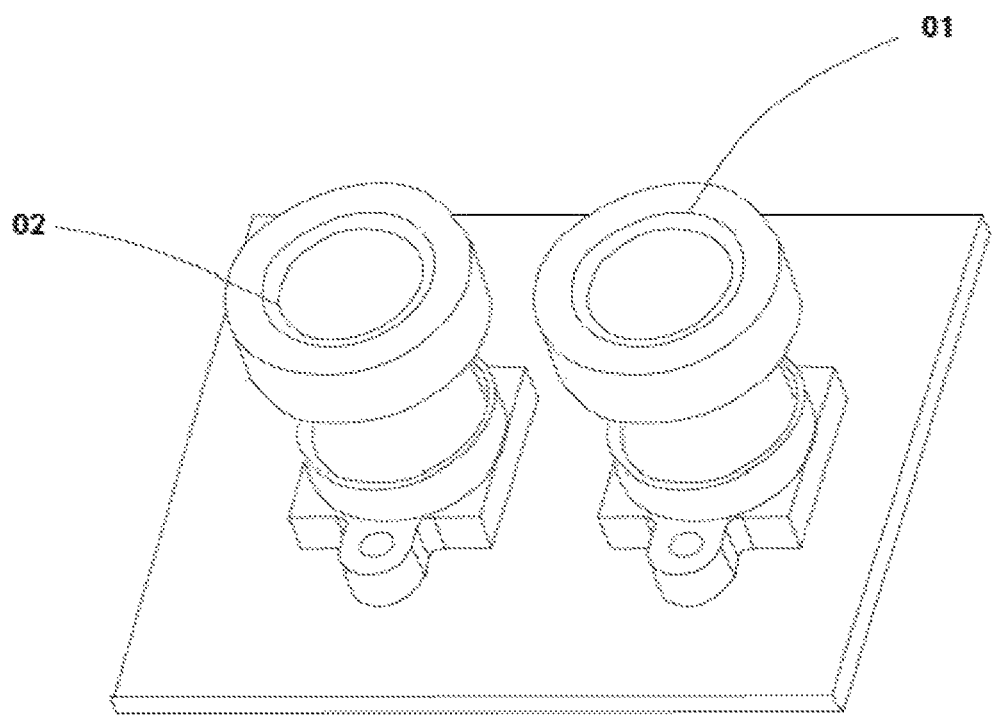
FIG. 1 is a first schematic structural diagram of a camera module according to an embodiment of the present invention.
Figure 2:
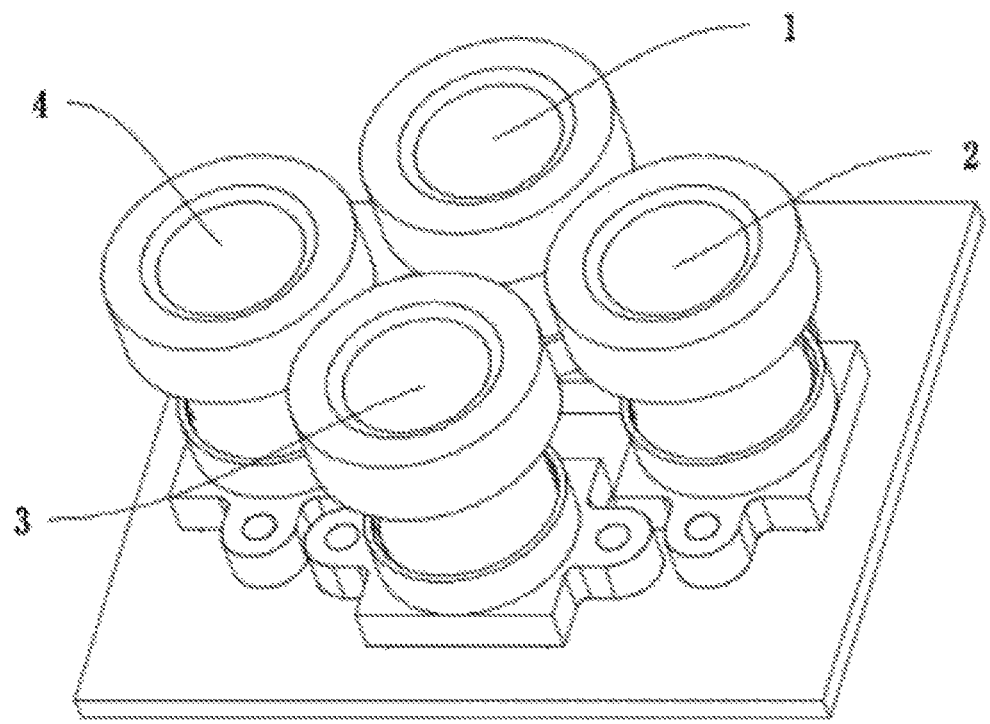
FIG. 2 is a second schematic structural diagram of a camera module according to an embodiment of the present invention.
Figure 3:
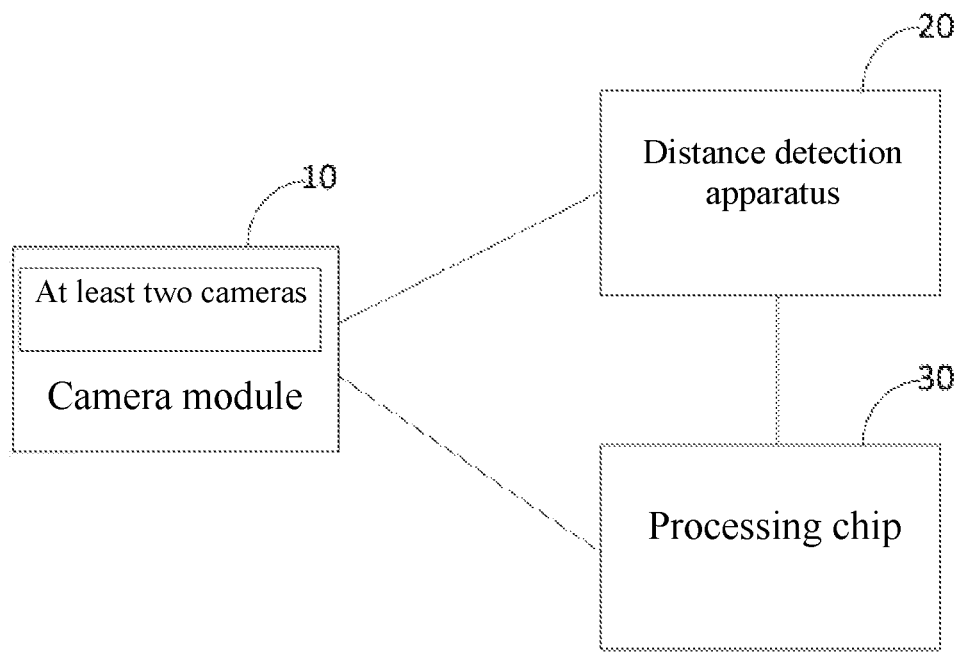
FIG. 3 is a schematic structural diagram of an iris identification system according to an embodiment of the present invention.

The present invention provides an iris identification system. As shown in FIG. 1 to FIG. 3, the iris identification system includes: a camera module 10, a distance detection apparatus 20 connected to the camera module 10, and a processing chip 30 connected to the camera module 10 and the distance detection apparatus 20 respectively.

The camera module 10 includes at least two cameras (FIG. 1 shows two cameras 01 and 02, FIG. 2 shows four cameras 1, 2, 3 and 4). The cameras have different depths of field and are configured to capture iris images.

The distance detection apparatus 20 is configured to detect a distance between a user and the camera module 10 and send the distance to the processing chip 30.

The processing chip 30 is configured to find, according to the detected distance, a depth of field corresponding the distance and control a camera having the depth of field to be turned on, and further configured to control multiple cameras in the camera module to be turned on simultaneously, until one camera has captured an ideal image.

It should be noted that, the multiple cameras of the camera module are turned on simultaneously, until one of the cameras captures an ideal image. In this case, the distance detection apparatus may not operate.

The iris identification system provided by the embodiment of the present invention includes: a camera module, a distance detection apparatus connected to the camera module, and a processing chip connected to the camera module and the distance detection apparatus respectively, wherein the camera module includes at least two cameras, the cameras having different depths of field and being configured to capture iris images; the distance detection apparatus is configured to detect a distance between a user and the camera module and send the distance to the processing chip; and the processing chip is configured to find, according to the detected distance, a depth of field corresponding the distance and control a camera having the depth of field to be turned on, and further configured to control multiple cameras in the camera module to be turned on simultaneously until one camera has captured an ideal image. At least two cameras having different depths of field are disposed in the iris identification system provided in the present application; a camera having a suitable depth of field is turned on correspondingly according to a detected distance between a user and a camera module to capture an image, or multiple cameras are turned on simultaneously until one camera has captured a clear iris image. As such, an overall range for iris acquisition can be expanded. Moreover, the present application achieves good man-machine friendliness and a short capturing time and improves the efficiency of iris identification.

Preferably, during a specific implementation, in the iris identification system provided by the embodiment of the present invention, as shown in FIG. 2, the camera module specifically can include four cameras, such as a first camera 1 having a first depth of field, a second camera 2 having a second depth of field, a third camera 3 having a third depth of field, and a fourth camera 4 having a fourth depth of field. The processing chip 30 is specifically configured to: control the first camera 1 to be turned on when it is detected that the distance is in a range of the first depth of field; control the second camera 2 to be turned on when it is detected that the distance is in a range of the second depth of field; control the third camera 3 to be turned on when it is detected that the distance is in a range of the third depth of field; and control the fourth camera 4 to be turned on when it is detected that the distance is in a range of the fourth depth of field.

It should be noted that the number of cameras in the camera module is not merely four (as shown in FIG. 2) in the foregoing embodiment but may also be 2 (as shown in FIG. 1), 3, 5, or the like, as long as the cameras can achieve a depth of field superposition principle and effect, which is not limited here.

Preferably, the range of the first depth of field may be 40 cm to 44 cm; the range of the second depth of field may be greater than 44 cm and less than or equal to 48 cm; the range of the third depth of field may be greater than 48 cm and less than or equal to 52 cm; and the range of the fourth depth of field may be greater than 52 cm and less than or equal to 56 cm. In other words, when it is detected that the distance from the user to the camera module is 40 cm to 44 cm, the first camera having the first depth of field is turned on. When it is detected that the distance from the user to the camera module is greater than 44 cm and less than or equal to 48 cm, the second camera having the second depth of field is turned on. When it is detected that the distance from the user to the camera module is greater than 48 cm and less than or equal to 52 cm, the third camera having the third depth of field is turned on. When it is detected that the distance from the user to the camera module is greater than 52 cm and less than or equal to 56 cm, the fourth camera having the fourth depth of field is turned on.

It should be noted that, the ranges of the first depth of field, the second depth of field, the third depth of field and the fourth depth of field above are not merely limited to the foregoing ranges, but may also be other ranges, which can be specifically determined according to an actual situation.

During a specific implementation, in the iris identification system provided by the embodiment of the present invention, as shown in FIG. 2, the first camera, the second camera, the third camera and the fourth camera may be arranged in a diagonal manner. Definitely, the four cameras may also be arranged in other manners, which are not limited here.

During a specific implementation, in the iris identification system provided by the embodiment of the present invention, the camera module may further include an auxiliary light source; and the auxiliary light source is an infrared light source.

Based on the same invention conception, an embodiment of the present invention further provides an iris identification method of the foregoing iris identification system provided by the embodiment of the present invention. A problem-solving principle of the method is similar to that of the foregoing iris identification system. Therefore, for the implementation of the method, reference can be made to the implementation of the iris identification system, and the repeated parts are not described in detail again.

Figure 4:
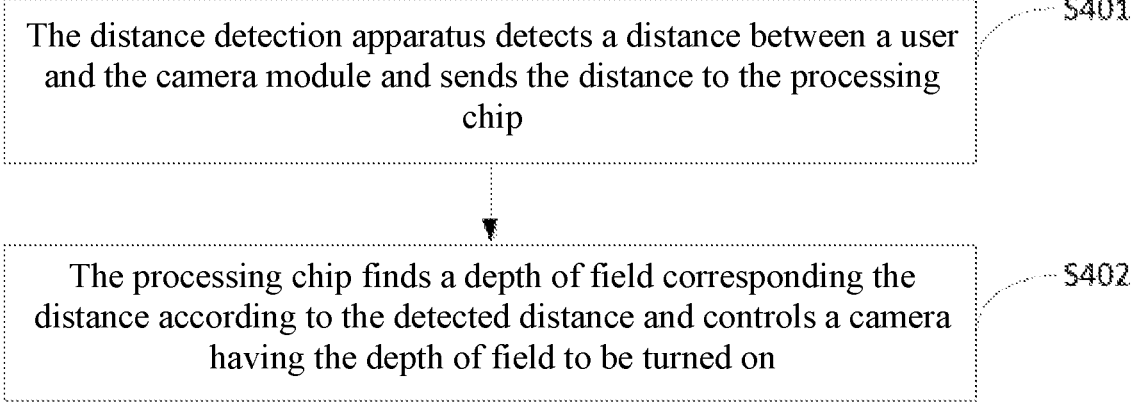
FIG. 4 is a flowchart of an iris identification method of an iris identification system according to an embodiment of the present invention.

During a specific implementation, in the iris identification method of the iris identification system provided by the embodiment of the present invention, the iris identification system includes a camera module, a distance detection apparatus connected to the camera module, and a processing chip connected to the distance detection apparatus. The camera module includes at least two cameras, and the cameras have different depths of field. As shown in FIG. 4, the iris identification method specifically includes the following steps:

S401: The distance detection apparatus detects a distance between a user and the camera module and sends the distance to the processing chip.

S402: The processing chip finds a depth of field corresponding the distance according to the detected distance and controls a camera having the depth of field to be turned on.

Alternatively, the iris identification method specifically includes the following steps:

The processing chip controls multiple cameras in the camera module to be turned on simultaneously until one camera has captured an ideal image.

In the iris identification method of the iris identification system provided by the embodiment of the present invention, a camera having a suitable depth of field can be turned on correspondingly according to a detected distance between a user and a camera module to capture a clear iris image, or multiple cameras in the camera module are controlled to be turned on simultaneously until one camera has captured an ideal image. As such, an overall range for iris acquisition can be expanded. Moreover, the iris identification method achieves good man-machine friendliness and a short capturing time and improves the efficiency of iris identification.

During a specific implementation, in the iris identification method of the iris identification system provided by the embodiment of the present invention, when the camera module specifically includes a first camera having a first depth of field, a second camera having a second depth of field, a third camera having a third depth of field, and a fourth camera having a fourth depth of field, step of S402 finding, by the processing chip according to the detected distance, a depth of field corresponding the distance and controlling a camera having the depth of field to be turned on may specifically include the following steps:

the processing chip controls the first camera to be turned on when it is detected that the distance is in a range of the first depth of field; the processing chip controls the second camera to be turned on when it is detected that the distance is in a range of the second depth of field; the processing chip controls the third camera to be turned on when it is detected that the distance is in a range of the third depth of field; and the processing chip controls the fourth camera to be turned on when it is detected that the distance is in a range of the fourth depth of field.

Preferably, the range of the first depth of field may be 40 cm to 44 cm; the range of the second depth of field may be greater than 44 cm and less than or equal to 48 cm; the range of the third depth of field may be greater than 48 cm and less than or equal to 52 cm; and the range of the fourth depth of field may be greater than 52 cm and less than or equal to 56 cm. In other words, when it is detected that the distance from the user to the camera module is 40 cm to 44 cm, the first camera having the first depth of field is turned on. When it is detected that the distance from the user to the camera module is greater than 44 cm and less than or equal to 48 cm, the second camera having the second depth of field is turned on. When it is detected that the distance from the user to the camera module is greater than 48 cm and less than or equal to 52 cm, the third camera having the third depth of field is turned on. When it is detected that the distance from the user to the camera module is greater than 52 cm and less than or equal to 56 cm, the fourth camera having the fourth depth of field is turned on.

It should be noted that, the ranges of the first depth of field, the second depth of field, the third depth of field and the fourth depth of field above are not merely limited to the foregoing ranges, but may also be other ranges, which can be specifically determined according to an actual situation.

During a specific implementation, in the iris identification method of the iris identification system provided by the embodiment of the present invention, the first camera, the second camera, the third camera and the fourth camera may be arranged in a diagonal manner. Definitely, the four cameras may also be arranged in other manners, which are not limited here.

During a specific implementation, in the iris identification method of the iris identification system provided by the embodiment of the present invention, the camera module may further include an auxiliary light source; and the auxiliary light source is an infrared light source.

The iris identification system and the iris identification method of same provided in the embodiments of the present invention include: a camera module, a distance detection apparatus connected to the camera module, and a processing chip connected to the camera module and the distance detection apparatus respectively, wherein the camera module includes at least two cameras, the cameras having different depths of field and being configured to capture iris images; the distance detection apparatus is configured to detect a distance between a user and the camera module and send the distance to the processing chip; and the processing chip is configured to find, according to the detected distance, a depth of field corresponding the distance and control a camera having the depth of field to be turned on, and further configured to control multiple cameras in the camera module to be turned on simultaneously until one camera has captured an ideal image. At least two cameras having different depths of field are disposed in the iris identification system provided in the present application; a camera having a suitable depth of field is turned on correspondingly according to a detected distance between a user and a camera module to capture an image, or multiple cameras are turned on simultaneously until one camera has captured a clear iris image. As such, an overall range for iris acquisition can be expanded. Moreover, the present application achieves good man-machine friendliness and a short capturing time and improves the efficiency of iris identification.

Finally, it should be noted that the relational terms such as "first" and "second" in the text are merely used to distinguish one entity or operation from another entity or operation, but do not necessarily require or imply the presence of such an actual relationship or sequence between the entities or operations. In addition, the terms "include," "comprise" or their other variations are intended to cover a non-exclusive inclusion, so that a process, method, object or device including a series of limits not only includes the elements, but also includes other elements that are not clearly listed, or further includes elements inherent to the process, method, object or device. Without more limitations, an element limited by the phrase "including a/an . . . " does not exclude that the process, method, object or device further includes other identical elements in addition to the element.

The iris identification system and the iris identification method of same provided in the present application are described in detail above. The principles and implementation manners of the present invention are illustrated by applying specific examples in this text. The above descriptions of the embodiments are merely used to help understand the method of the present invention and its core ideas. Meanwhile, for those of ordinary skill in the art, modifications can be made on the specific implementation manners and application scopes according to the idea of the present invention. Therefore, the content of the specification should not be construed as limitations to the present invention.

The invention claimed is:

1. An iris identification system comprising:
    a camera module;
    a distance detection apparatus connected to the camera module; and
    a processing chip connected to the camera module and the distance detection apparatus respectively, wherein
    the camera module comprises at least two cameras having different depths of field and being configured to capture iris images;
    the distance detection apparatus is configured to detect a distance between a user and the camera module and send the distance to the processing chip; and
    the processing chip is configured to determine, according to the detected distance, a depth of field corresponding to the detected distance and control a camera, from the at least two cameras, having the determined depth of field to be turned on to capture an image of an iris of the user.

2. The iris identification system according to claim 1, wherein the camera module comprises a first camera having a first depth of field, a second camera having a second depth of field, a third camera having a third depth of field, and a fourth camera having a fourth depth of field, the first depth of field, the second depth of field, the third depth of field, and the fourth depth of field each being different with regards to each other, and wherein the processing chip is further configured to
    control the first camera to be turned on when it is detected that the distance is in a range of the first depth of field, control the second camera to be turned on when it is detected that the distance is in a range of the second depth of field, control the third camera to be turned on when it is detected that the distance is in a range of the third depth of field, and control the fourth camera to be turned on when it is detected that the distance is in a range of the fourth depth of field.

3. The iris identification system according to claim 2, wherein the range of the first depth of field is 40 cm to 44 cm, the range of the second depth of field is greater than 44 cm and less than or equal to 48 cm, the range of the third depth of field is greater than 48 cm and less than or equal to 52 cm, and the range of the fourth depth of field is greater than 52 cm and less than or equal to 56 cm.

4. The iris identification system according to claim 3, wherein the first camera, the second camera, the third camera, and the fourth camera are arranged in a diagonal manner.

5. The iris identification system according to claim 1, wherein the camera module further comprises an auxiliary light source, the auxiliary light source being an infrared light source.

6. The iris identification system according to claim 1, wherein the distance detection apparatus is configured to detect the distance between the user and the camera module while maintaining the at least cameras in an inactive state.

7. The iris identification system according to claim 1, wherein the processing chip is further configured to control both of the at least two cameras in the camera module to be turned on simultaneously, until one of said at least two cameras has captured the image of the iris.

8. A method implemented on at least one machine, each of which has at least one processor, storage, and a communication platform connected to a network for iris identification, the method comprising:

detecting, by a distance detection apparatus, a distance between a user and a camera module, the camera module comprising at least two cameras having different depths of field and being configured to capture iris images;

sending the detected distance to a processing chip;

determining, by the processing chip and according to the detected distance, a depth of field corresponding to the detected distance; and controlling a camera, from the at least two cameras, having the determined depth of field to be turned on to capture an image of an iris of the user.

9. The iris identification method according to claim 8, wherein the camera module specifically comprises a first camera having a first depth of field, a second camera having a second depth of field, a third camera having a third depth of field, and a fourth camera having a fourth depth of field, the first depth of field, the second depth of field, the third depth of field, and the fourth depth of field each being different with regards to each other, and wherein the step of determining further comprises:

controlling, by the processing chip, the first camera to be turned on when it is detected that the distance is in a range of the first depth of field; controlling, by the processing chip, the second camera to be turned on when it is detected that the distance is in a range of the second depth of field; controlling, by the processing chip, the third camera to be turned on when it is detected that the distance is in a range of the third depth of field; and controlling, by the processing chip, the fourth camera to be turned on when it is detected that the distance is in a range of the fourth depth of field.

10. The iris identification method according to claim 9, wherein the range of the first depth of field is 40 cm to 44 cm, the range of the second depth of field is greater than 44 cm and less than or equal to 48 cm, the range of the third depth of field is greater than 48 cm and less than or equal to 52 cm, and the range of the fourth depth of field is greater than 52 cm and less than or equal to 56 cm.

11. The iris identification method according to claim 10, wherein the first camera, the second camera, the third camera, and the fourth camera are arranged in a diagonal manner.

12. The iris identification method according to claim 8, wherein the camera module further comprises an auxiliary light source the auxiliary light source being an infrared light source.

13. The iris identification method according to claim 8, wherein the controlling by the processing chip further comprises controlling both of the at least two cameras in the camera module to be turned on simultaneously, until one camera has captured the image of the iris.

\* \* \* \* \*